No. 772,024. PATENTED OCT. 11, 1904.
A. M. BULLARD & L. A. FALK.
AUTOMATIC TELEPHONE EXCHANGE SYSTEM AND APPARATUS.
APPLICATION FILED FEB. 12, 1904.
NO MODEL. 2 SHEETS—SHEET 1.

WITNESSES:
Frank C. Lockwood.
Joseph A. Gately.

INVENTORS
Albert M. Bullard,
Louis A. Falk
BY
Thomas D. Lockwood.
ATTORNEY.

No. 772,024. Patented October 11, 1904.

UNITED STATES PATENT OFFICE.

ALBERT M. BULLARD, OF NEW YORK, N. Y., AND LOUIS A. FALK, OF BOSTON, MASSACHUSETTS, ASSIGNORS TO AMERICAN TELEPHONE AND TELEGRAPH COMPANY, A CORPORATION OF NEW YORK.

AUTOMATIC TELEPHONE-EXCHANGE SYSTEM AND APPARATUS.

SPECIFICATION forming part of Letters Patent No. 772,024, dated October 11, 1904.

Application filed February 12, 1904. Serial No. 193,296. (No model.)

*To all whom it may concern:*

Be it known that we, ALBERT M. BULLARD, residing at New York, in the county of New York and State of New York, and LOUIS A. FALK, residing at Boston, in the county of Suffolk and State of Massachusetts, have invented certain Improvements in Automatic Telephone-Exchange Systems and Apparatus, of which the following is a specification.

The invention about to be described is an improvement in automatic telephone-exchange apparatus and circuits, having particular reference to such exchanges as are limited to a small number of subscribers' circuits, some or all of which may be party-lines or lines having a plurality of subscribers connected thereto, and is well adapted for use in small towns, offices, or warehouses and for like conditions of installation where an inexpensive type of apparatus is desirable.

The automatic exchange apparatus as described herein is designed for ten metallic telephone-circuits extending from their respective substations to the central station, where is located a common source of electromotive force supplying current for operating the system and for signaling, the telephonic transmission being effected by batteries at each substation. On the assumption that many of the small places where an exchange of this character would be installed will not be equipped with facilities for charging secondary batteries the system is arranged to be operated by primary cells, which are comparatively easy of control. At the substations the apparatus consists of the usual high-resistance call-bell and condenser in a bridge or inductively continuous connection between the line conductors, with telephones, a selecting-key and a ringing-key respectively adapted to ground the respective line conductors alternately in a normally open branch parallel with the bell and condenser. At the central station each conductor of each telephone-circuit is connected to a polarized line-relay, one of which relays is termed the "selecting-relay" and the other the "ringing-relay." Both relays are in circuit with the central battery and control the several circuits necessary for the series of operations initiated by the suspension-switch and the keys at a substation by means of a small and compact selector or switching device interposed between their armature-contacts, and both also are energized and attract their armatures when the telephone is removed at the substation.

The selector consists of two electromagnets, first, the selecting-magnet which is operated only when the selecting-relay is inert and the ringing-relay is excited, thus economizing the current-supply, and, second, the retaining-pawl magnet adapted to attract its armature as long as either of the line-relays is excited. The selector-magnet is adapted to rotate selector-springs step by step against the tension of a recovery-spring round a dial on which are mounted two inner segmental conductor-plates which form the terminals of the line conductors of the circuit and a series of studs contiguous to and outside of the said plates and each representing the terminal of a line conductor of an associated substation-circuit, and each pair of selector-springs acts as a movable connector to join any stud with the corresponding semicircular plate, and thereby unite the respective line conductors of the calling and selected substations. The selector-springs of each substation-circuit-switching device at the central station normally rest upon two studs, forming the terminals of an interruption in each line conductor and to unite the same; but when the selecting-key is operated to connect with another circuit the conductors are opened at these points and connection made by the selector-springs with the semicircular plates and studs of the line wanted. The movable selector-springs are thus utilized for the double purpose of selecting and switching, effecting great economy in the number of parts comprising the selector device. After the selector has been operated the signal-key is pressed a number of times corresponding, according to the code, to the wanted substation, and a pulsating ringing-current of single direction is sent over a grounded circuit including the conductors and bell of the called line, the means for producing the pulsating current being operative only when the call is being made, and when the telephone of the calling subscriber is replaced upon the suspension-switch the current is opened, the line-relays are deënergized, and the selector-springs of the selector are automatically returned to their normal contacts by the said recovery-spring.

The invention also relates to combinations of circuits and apparatus more fully and specifically described hereinafter.

Reference is made to the accompanying drawings, in which—

Figure 6:
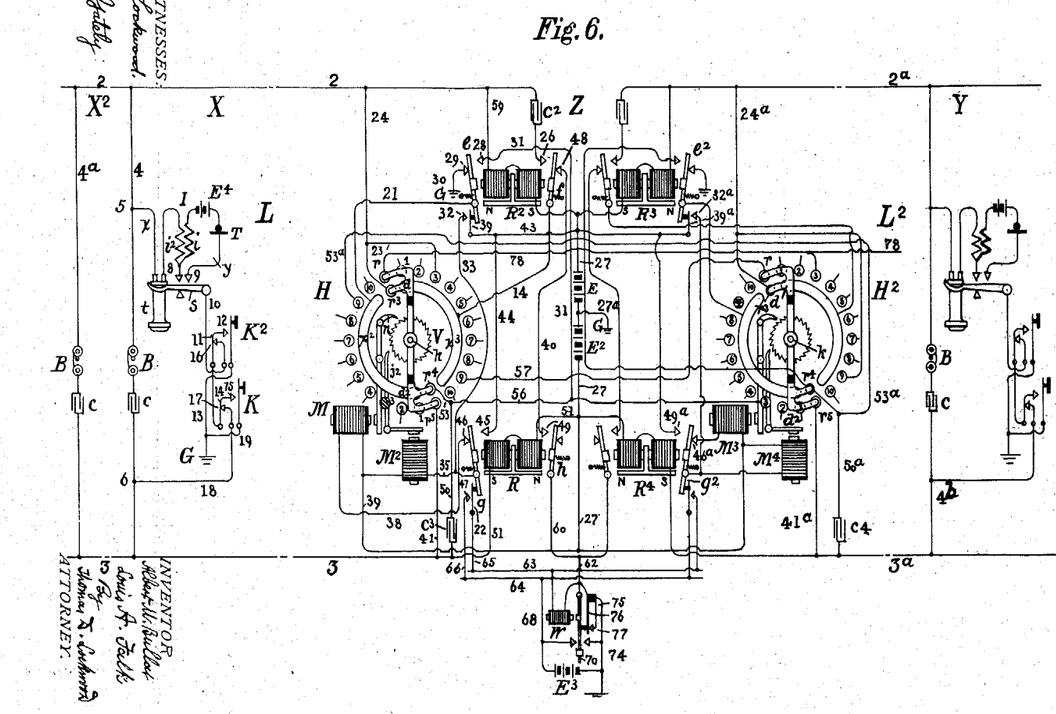
Fig. 6 is a diagram illustrative of the substation apparatus, circuits, and line-wires of two subscribers only, with the circuits and equipment of the exchange, the terminal connections of the remaining substation-circuits being simply indicated at the exchange apparatus.

In the drawings, X and Y represent the substation-terminals of the telephone-circuits L and L², whose conductors 2 and 3 and 2ª and 3ª terminate in automatic selective and switching apparatus H and H² at the central station Z. The circuit L may be called "No. 3" and the circuit L² "No. 9."

The apparatus at the substations consists of a high-resistance polarized call-bell B, biased or adjusted to respond to a pulsatory or intermittent current of single direction, and a condenser $c$ in a bridge 4 between the main conductors 2 and 3, together with the station-telephones and the selecting and ringing keys K and K² in a normally open branch of said bridge extending between the points 5 and 6 thereof. The wire $x$, including the telephone-receiver $t$, connects the point 5 to the secondary winding $i^2$ of the induction-coil I, the other end of said winding being joined to the upper switch-contact stop 8, while the primary winding $i$ is in a local circuit $y$, extending between said contact-stop and a second contact-stop 9, and including the transmitter T and the local transmitter-battery E⁴.

The selecting and ringing keys K K² are respectively connected to ground by wires 19 and 13, having anvil-contacts 15 and 12, supported on springs 14 and 11, and normally closed separable contacts at 17 and 16 in series with each other. When manipulated, the phone being off its hook-switch, the selecting-key K closes its working contact 15, thus grounding the main conductor 2 and severs its normal contact 17, thus opening the main circuit toward main conductor 3, while the ringing-key K² closes contact 12 and opens contact 16, thus grounding main conductor 3 and opening the circuit toward main conductor 2.

When the receiver is taken from the switch $s$, a conductive circuit is closed through the substation between conductors 2 and 3 by way of the bridge-conductor point 5, conductor $x$, switch-contact stop 8, the switch $s$, wire 10, closed contact 16, springs 11 and 14, closed contact 17, and wire 18 to point 6. The circuit L is assumed to have more than one substation associated with it, and the bridge 4ª between the conductors 2 and 3 conventionally represents a second station X².

Figs. 2, 3, 4, and 5 refer to the selective and switching mechanism located at the central office end of each substation-circuit, which will now be described. The said mechanism has a metal base-plate 100, upon which are secured the electromagnets M and M², the former constituting the selecting-magnet and the latter the ringing-magnet. Two standards 101 and 102 extend outward from the plate 100 beyond the poles of the magnet-spools and their outer ends are provided with holes to receive the ends of the rods 103 and 104, upon the outer ends of which are pivoted the armatures $o$ and $j$. The armatures extend across the poles of the magnets and on one end have downward projections 105 and 106, respectively, and in the drawings the said armatures are shown attracted. 94 is a double back-stop provided with the stops 86 and 88, secured to standard 102 by screw 85 and pin 107, and $s^3$ and $s^4$ are retracting-springs made V-shaped, with a central coil adapted to rest upon the ends of the rods 104 and 103, the ends of their outer legs bearing upon the pins 89 and 95 of the projections 106 and 105, while their inner legs bear upon the pin 107. Upon the end of the projection 106 is a pawl $n$ to engage with the teeth of the ratchet-wheel V upon the spindle $k$, which is supported at each end by the standards 101 and 102, the said spindle being provided with a recovery-spring S, secured thereto at one end by the screw 108 and at the opposite end having its end entered in a hole 109 in the standard 101. The pawl $n$ is pivoted on the screw 92 and is provided with a stop-pin 90, and at the end of projection 105 is a retaining-pawl $j^2$, limited by the stop-pin 93 and adapted to engage the teeth of the wheel and prevent its backward movement. Upon the upper side of the standard 101 is a stationary disk or dial $q$, of insulating material, into which near the edge are inserted a series of metal buttons $r$, twenty-two in number, and inside of the buttons are two semicircular or segmental plates, of metal, $x^2$ $x^3$, between the ends of which are buttons $r^3$ and $r^4$. The buttons are connected with binding-screws $u$ upon the under side of the disk. The spindle $k$ extends through the disk $q$ and bears upon its end a hub $w$, upon which is an insulating-ring, the ends of the two metal fingers $d^2$, another non-conducting ring, the ends of the two metal fingers $d$, a final insulating-ring, and the thumb-screw $v$, which holds the rings and fingers together. One finger of each pair of selecting and switching springs $d$ and $d^2$ is longer than its mate, and is arranged to bear upon the outer row of buttons $r$, while the shorter spring is adapted to bear upon the semicircular plates $x^2 x^3$ and the inner buttons $r^3$ and $r^4$. In the position of disuse the springs rest upon and connect the buttons $r r^3$ and $r r^4$, and when in motion they rotate about the disk in a clockwise direction.

Figure 1:
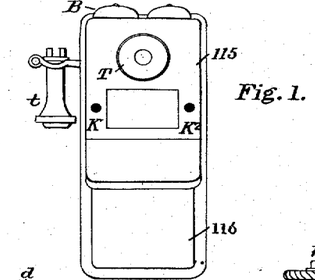
Figure 1 is a front view of the substation telephone set.
Figure 2:
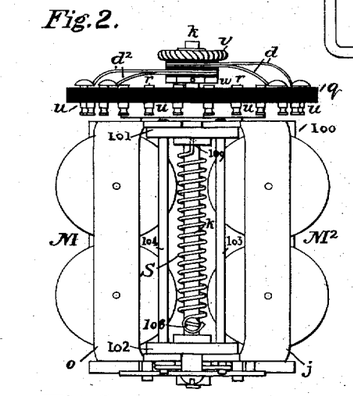
Figs. 2, 3, 4, and 5 are respectively an end elevation, side elevation, a top view, and a bottom view, of a selective and switching device used at the central station.
Figure 3:
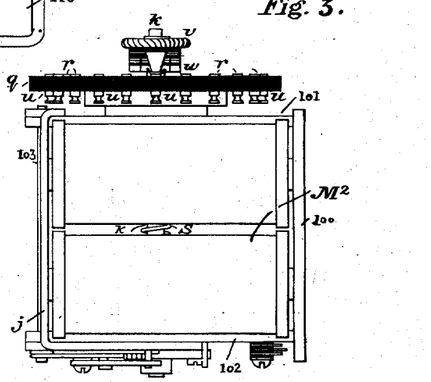
Figure 4:
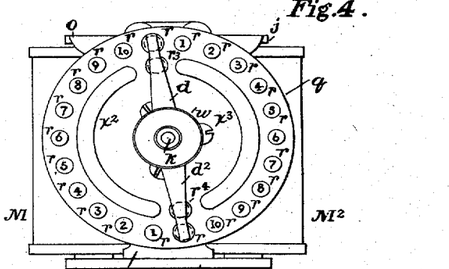
Figure 5:
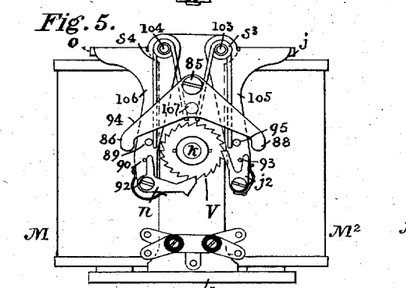

Fig. 1 is a representation of the external appearance of the substation apparatus, the operative parts being inclosed in the upper part 115 and the batteries in the lower part 116, the selecting and signaling keys K K$^2$, the call-bell B, and telephones T $t$ being appropriately indicated.

As represented in Fig. 6, the L circuit No. 3 and the L$^2$ circuit No. 9 are in their condition of disuse and the selecting and switching springs $d$ and $d^2$ are upon their normal buttons in a position to be called by each other, the said normal buttons of circuit L being connected to the conductors 2 and 3 as follows: from conductor 2 by conductor 24 to button $r^3$, fingers $d$, button $r$, from which the line No. 3 is extended to the selecting and switching mechanism of line No. 9 and to multiple buttons at the mechanism of all other lines of the system, by conductor 78, a branch 23, from conductor 24 connecting to button 3 at the apparatus H, and from conductor 3 by conductor 41 to button $r^5$, fingers $d^2$, button $r^4$, and conductors 53 and 56 to button 3 of the apparatus H$^2$. The conductors 2 and 3 have a connection by means of the conductors 59 and 51 with the line-relays R$^2$ and R, respectively, and through the bridge 27, which includes battery-sections E and E$^2$, provided between them with a branch 27$^a$ to ground. R is the selecting-relay, and R$^2$ the ringing-relay, both being polarized to assist in the ringing operations.

The details of the circuits will be referred to in the description of the operation as follows: It may be assumed that a call has originated with substation X of circuit L, (No. 3,) who wishes to connect with substation Y of circuit L$^2$, (No. 9.) The receiving-telephone $t$ is removed from the switch $s$, which rises and engages the stops 8 and 9, thus completing a circuit from the switch $s$ through secondary coil $i^2$, bridge conductor 4, conductors 2 and 59, relay R$^2$, conductor 27, battery E E$^2$, conductor 51, relay R, conductor 3, bridge conductor 4, branch conductor 18, and through the keys K and K$^2$ back to the switch. The selecting-relay R and ringing-relay R$^2$ are energized, the armatures $g$ $h$ of relay R being attracted to their front stops 45 and 49 and the armatures $e$ $f$ of relay R$^2$ to their forward stops 28 and 26. Of the several circuits controlled by these relays reference may first be made to the local circuit including the retaining-pawl magnet M$^2$, which is closed by both relays as follows: The armature $e$ of relay R$^2$ closes this circuit at the auxiliary stop 32 over a path beginning at the positive terminal of the central battery E E$^2$, conductors 27 and 43, spring 39, (insulated from the armature,) contact-stop 32, conductors 33 and 35, retaining-pawl magnet M$^2$, conductors 39 and 27 to the negative pole of the battery. The relay R closes the same circuit at contact 45 over a path from the said positive terminal of battery E E$^2$ through conductors 27, 43, and 44, contact-stop 45, armature $g$, conductor 35, magnet M$^2$, and conductors 39 and 27 back to the battery. It is seen that this circuit when closed by the armature of either relay in its forward position will keep the retaining-pawl $j^2$ pressed against the ratchet-wheel V and that opening and closing the metallic circuit of line L, formed through the line conductors 2 and 3, results merely in the backward-and-forward movement of the retaining-pawl $j^2$, which does not move the ratchet-wheel. To select line No. 9, which we have assumed is circuit L$^2$, the attendant at X presses the selecting-key K nine times. This may be done at any reasonable rate of speed, and in response to each pressure the selector-spindle $k$ is rotated one step in the following manner: The key is pressed hard against the stop 15, bending the spring 14 away from the normal contact-stop 17, grounding the main conductor 2 and opening the main conductor 3 side of the line, and relay R$^2$ therefore remains energized, being maintained in a grounded circuit from earth branch 27$^a$ to the substation-ground, including battery E, conductors 27 and 59, relay R$^2$, conductors 2, 4, and $x$, switch $s$, wires 10 and 11, stop 15, key K, and wire 19, while the relay R is deënergized so that its armature $g$ falls back upon stop 46 and closes a local circuit through the selecting-magnet M, which, beginning at the positive side of the battery E E$^2$, continues through conductors 27 and 43, stop 32, conductor 33, armature $g$, stop 46, conductor 38, magnet M, and conductors 39 and 27 to battery. This energizes the selector-magnet M and causes its pawl $n$ to revolve the selector-fingers from the buttons $r r^3$ and $r^4 r^5$ to the buttons 1, which are the terminals of line No. 1, and bring them into contact with the semicircular universal terminal plates $x^2$ and $x^3$. When the key K is released, the magnet M releases its armature, which falls back ready for another step, which takes place when the key is again pressed, and nine successive depressions of said key will thus advance the selector-fingers to the buttons 9 9 of line No. 9. The double springs $d$, one at each end of the selector-arm, make constant frictional contact with the successive line-buttons and are held in their advanced position by the retaining-pawl magnet M$^2$, which receives current through the stop 32 of relay $R^2$, as already described. Having stepped the selecting and switching springs to the buttons 9 9 of the apparatus H, a circuit is established with the apparatus $H^2$, associated with the circuit No. 9, and the subscriber at X now presses the ringing-key $K^2$ once if the subscriber at Y is the only station on the circuit $L^2$. If, however, there are more stations on the circuit, the key is pressed a number of times, corresponding to the code-number of the station, and at each pressure of the key the conductor 2 is opened and the relay $R^2$ deënergized, allowing the armature $e$ to be retracted against contact-stop 29, and thus ground the ringing-circuit at one end, the circuit through conductor 3 and the excitement of relay R being maintained to hold the retaining-pawl in position. The circuit for the ringing-current may be traced from grounded source of current $E^3$, the rhythmical vibrator 70, conductors 62 and 60, armature $h$ of relay R, stop 49, conductor 40, stop 48 and armature $f$ of relay $R^2$, conductor 14, segmental plate $x^3$, selector-spring $d$, button 9, conductor 57 to button $r$ of apparatus $H^2$, selector-spring $d$, button $r^3$, conductor $24^a$, line conductor $2^a$, call-bell B, and condenser $c$ of station Y, main-line conductor $3^a$, conductor $41^a$, conductor $53^a$, to button 9 of apparatus H, spring $d^2$, plate $x^2$, conductor 21, armature $e$ of relay $R^2$, stop 29, and branch 30 to ground. The condensers $c^3$ and $c^4$ are normally short-circuited by the selector-spring $d^2$ of each selecting device H $H^2$ resting upon the buttons $r^4$ $r^5$ and conductor $41^a$, (or 41,) so that upon the receipt of a call the called line is in condition to be signaled most effectively and to be combined with the calling-line in such manner that the united lines form a well-balanced circuit for telephonic transmission.

Referring to the operation of calling just described, it is evident that if condenser $c^4$ of the line $L^2$ were not thus short-circuited the ringing-current would have to return to ground at the armature $e$ of relay $R^2$ from conductor $3^a$, through condenser $c^4$, and conductor $50^a$, and the presence of the condenser would so greatly reduce the strength of the ringing-current that the bells would not be rung loud enough. Another reason for keeping the condenser $c^4$ short-circuited when line $L^2$ is called is to avoid having two condensers on one side of the combined lines and but one condenser on the other. In all of these operations the receiver $t$ remains off from the switch, and the circuit when the keys are not being manipulated is through the polarized line-relays R $R^2$ and battery E $E^2$. Consequently the relay-armatures are attracted, and armature $g$ of relay R presses the spring 22 against the stop 47, thus closing the circuit of the source of pulsating current $E^3$ via conductors 68, 64, and 66, stop 47, spring 22, conductors 65 and 63, vibrator-magnet W, spring 76, stop 77, spring 75, and conductor 74, and setting the rhythmical vibrator (which is of well-known construction) in motion. When now the ringing-key $K^2$ is pressed, the electromagnet W remains energized, and as the armature of the vibrator 70 is attracted and repelled to and from the magnet W it makes contact alternately with the ground-stop and a contact-stop branched from the positive pole, and so sends a pulsating ringing-current of single direction over the circuit $L^2$ by the path previously traced through the armature $h$ of relay R and the armature $f$ of relay $R^2$. During the ringing operation the relay $R^4$ of the called line is shunted by the temporary ground G at the back-stop 29 of relay $R^2$, and ringing-current is diverted round relay $R^4$ directly to said ground. This arrangement, however, involves the inclusion of the said relay $R^4$ in an incidental local circuit between the said temporary ground and the ground attached between the two battery-sections E $E^2$. This circuit is traceable from the former ground by stop 29, armature $e$ of relay $R^2$, conductor 21, switch-plate $x^2$, brush-spring $d$, button 9, conductor $53^a$, brush-spring $d^2$ of mechanism $H^2$, conductor $41^a$ to the magnet-coils of relay $R^4$, conductor 27, battery-section $E^2$, and conductor $27^a$; but the temporary connection of the relay $R^4$ in this circuit is of no consequence, since though it brings about the excitement of said relay and the attraction of its armatures once for each stroke of the ringing-key this is not followed by any operation of the selecting-magnet $M^3$, for the reason that the circuit of said magnet remains open between the points $32^a$ and $39^a$ of the ringing-relay $R^3$. During ringing the relay R of the circuit L retains its armatures in their forward position, so that by means of the already-traced local circuit passing through the armature $g$ and contact-stop 45 the retaining-pawl $j^2$ remains in engagement with the ratchet-wheel V and prevents the selector-spindle from recovery. When the subscriber Y answers the call by lifting his receiver from his switch, his relays $R^3$ and $R^4$ steadily attract their armatures; but these movements are without significance and do not cause the selector $H^2$ to advance, for armature $g^2$ of relay $R^4$ leaves the stop $46^a$ before the armature $e^2$ of relay $R^3$ makes contact between the spring $39^a$ and stop $32^a$, and therefore the selecting-magnet $M^3$ is not energized. Telephonic transmission may now be effected over the following circuit: secondary winding $i^2$ of induction-coil at station X, receiver $t$, conductors 4 and 2, condenser $c^2$, stop 26, armature $f$, conductor 14, segmental plate $x^3$, switching-spring $d$, and button 9, conductor 57, button $r$, switching-spring $d$, and button $r^3$ of switch mechanism $H^2$, conductors $24^a$ and $2^a$, bridge $4^b$, the telephones and keys connected therein at station Y, conductor $3^a$, conductor $41^a$, button $r^5$, switching-spring $d^2$, button $r^4$, conductor 53ª, button 9, switching-spring $d$, and semicircular plate $x^3$ of switch mechanism H, conductor 21, armature $e$, stop 28, conductors 31, 56, and 50, condenser $c^3$, conductor 3, and by bridge 4 and branch 18 back to the telephones at station X. The presence of the condensers $c^2$ and $c^3$ in this common circuit separates the circuits of X and Y in so far as direct currents are concerned, so that a subscriber's relays cannot be kept out of use by connection with the line of another subscriber who refuses to hang up his telephone, and therefore a subscriber can at will free himself from any other line under all conditions.

It will be seen that the selecting mechanism of a call-originating line at the first rotary step of the selector-spindle disconnects its selecting and switching apparatus from the multiple conductor 78, this remaining disconnected until the spindle returns to zero, so that the process of selecting and ringing cannot be interfered with by other subscribers calling such line and disturbing its relays with ground-shunts and ringing-current. Upon the termination of conversation the receivers are returned to the suspension-switches $s$, which are thereby depressed and open the line-circuit, and the line-relays being demagnetized the retaining-pawl falls back and the recovery-spring S returns the switching-springs to their resting positions. Should the line of the called subscriber Y have been already called by another station and connected therewith before its selection by subscriber X, the latter would be made aware of that fact by hearing conversation, for in this case the switching-springs $d$ $d^2$ of the apparatus $H^2$ of line $L^2$ have not been moved from their normal position, and connections will therefore be established between the main conductors of lines X and Y, as previously stated in describing the selection of subscriber Y by subscriber X, when the line of the former is at liberty; but if the subscriber Y in the previously-made connection referred to had been the selecting party then X in selecting would fail to establish connection with the line of Y, because the said switching-springs $d$ $d^2$ of the switch $H^2$ would have been moved from the local switch-buttons, the intermediate circuit connections being thus opened. Thus in the former case of the busy condition of the wanted line the calling line may after selection hear conversation, while in the latter case the calling subscriber hears nothing, but is merely unable to connect. In case any substation—say X—on a party-line wishes to call a second substation—say $X^2$—on the same line the selecting and ringing keys are manipulated in exactly the same way as in calling another line, and if X is No. 1 on his line and $X^2$ is No. 2 the selecting-key is pressed three times and the ringing-key pressed twice. The first act steps his selector-springs $d$ $d^2$ into contact with the buttons 3 3 and the segmental plates $x^2$ $x^3$ of their own line No. 3. One of said buttons is connected by wire 23 with the conductor 24 and line conductor 2 in order that ringing-current may be sent over said line conductor 2 notwithstanding that the multiple conductor 78 has been opened at buttons $r$ $r^3$ by the selective act. The other button, 3, might be dispensed with, for it plays no part either in ringing or transmission, but is needed as a mechanical support for one selector-spring. In signaling the substation $X^2$ at each depression of the key $K^2$ the relay $R^2$ releases its armatures and the current traverses the following circuit: from the grounded source of ringing-current $E^3$ by vibrater 70, conductors 62 and 60, armature $h$ of relay R, stop 49, conductor 40, stop 48 of relay $R^2$, armature $f$, wire 14, plate $x^3$, switching-spring $d$, button 3, conductors 23, 24, 2 and $4^a$, bell B, and condenser $c$, point 6, conductor 18, and through key K to key $K^2$ and ground at station $X^2$. All of the bells bridged on the line are rung, including that of subscriber X. A negligible amount of the ringing-current returns to the central station over the conductor 3, through the relay R and battery $E^2$ to ground without, however, disturbing said relay, as the pulsating ringing-current is of the same sign as the battery-current flowing therethrough. A small amount of ringing-current also flows to ground from the junction-point 59, through the relay $R^2$ and battery E, but without operating said relay, which is polarized to be irresponsive to positive current entering its winding from the side toward said junction-point. It is essential that the ringing-current shall not affect the operation of ringing-relay $R^2$, that its armature $f$ shall rest firmly upon the back-stop 48 when the ringing-key is pressed, and shall move promptly into the forward position upon stop 26 when the key is released, and as the relay $R^2$ must remain in the current-supply circuit with one terminal connected to line and since it is necessary to apply ringing-current to the same side of the line at virtually the same point as that of said relay connection a pulsating ringing-current is used instead of the ordinary alternating current, the relays R and $R^2$ being polarized and the call-bells also polarized and adjusted or biased to be responsive to the pulsating current of proper direction only.

We claim as our invention—

1. In an automatic telephone-exchange, the combination of a group of metallic substation-circuits, an automatic switch and a selecting-key in a bridge between the conductors of the metallic circuit at each substation, the switch normally maintaining the bridge discontinuous; with apparatus at the central station consisting of a relay in each line conductor, said relays having helices connected to the opposite poles respectively of a centrally-grounded source of current, a selecting and switching device having a rotatable switching-connector, and terminals in the path thereof of branch conductors of the main line and also terminals of conductors to the switching devices of all the other members of the group, a selecting-electromagnet to rotate the said switching-connector into contact with said terminals successively, and a retaining-electromagnet to hold the said connector in position on the terminals of the circuits; the said apparatus adapted to become operative upon the closure of said bridge by the automatic switch causing said relays to close independent local circuits through the retaining-magnet, and upon the subsequent manipulation of the selecting-key to deënergize the selecting polarized line-relay opening one of said independent local circuits and closing another local circuit through said selecting-magnet, substantially as set forth.

2. In an automatic telephone-exchange, the combination of a group of metallic substation-circuits, apparatus at each substation of said metallic circuits consisting of a call-bell and a condenser in a bridge between the line conductors, with telephones, a selecting-key and a ringing-key in parallel with said bridge, the selecting-key being adapted to ground one line conductor and the ringing-key to ground the other line conductor; apparatus at the central station consisting of a polarized relay in each line conductor said relays having their helices connected to the opposite poles of a centrally-grounded source of current, and a selecting and switching device operated through said line-relays having terminals of its own main-line conductors and terminals of the main-line conductors of the other circuits with which it is multiplied, and a rotatable switching-connector adapted to trail over said terminals, a selecting-electromagnet adapted to rotate the switching-connector upon the manipulation of the selecting-key, and a retaining-magnet to hold the connector in position upon the line-terminals, successively operated upon the closure of the main-line circuit by the automatic switch through the medium of one or both of the line-relays, as set forth.

3. In an automatic telephone-exchange, the combination of a group of metallic substation-circuits, apparatus at the substation of each metallic circuit consisting of a biased polarized call-bell and a condenser in a bridge between the line conductors, with telephones, a selecting-key, and a ringing-key, in parallel with the said bridge, the said keys being each adapted to ground a different one of the said line conductors and to open the other; and central-station apparatus comprising a polarized relay in each line conductor, the helices of said relays being connected to the opposite poles of a centrally-grounded source of current, a selecting and switching device operated through said line-relays, having a rotating switching-connector in whose path are located terminals of its own main-line conductors and terminals of the main-line conductors of the other circuits with which it is multiplied, with a source of pulsating ringing-current, and means for automatically switching the same to the ringing side of the metallic circuit when the said ringing-key is manipulated; as set forth.

4. In an automatic telephone-exchange, the combination with a group of metallic substation-circuits; a biased polarized call-bell, and a condenser in series therewith bridged between the main conductors of each circuit; and telephones in a normally open branch of said bridge in parallel to said bell, all at each substation of said circuits; of a selecting-key and a ringing-key also in said branch at each substation, said keys being adapted each to ground a different one of said line conductors and to open the circuit of the other; a common centrally-grounded battery; polarized relays, one in each main conductor having helices connected respectively to the opposite poles of said battery; a switching mechanism for each substation-circuit comprising a dial on which are mounted terminals of all of the several circuits of the system, and a rotatable switching-connector adapted to move over said terminals successively, a selecting-magnet adapted to actuate said switching-connector responsively to said selecting-key, and a retaining-pawl magnet to hold it in any position to which they have been moved in a local circuit jointly controlled by said relays; a pulsatory or intermittent call-current generator; and means for switching the same to the main conductor grounded by said ringing-key; the said battery, relays, switch mechanism, and call-generator being all at the central station; substantially as set forth.

5. In an automatic telephone-exchange, the combination of a group of metallic substation-circuits provided with a polarized relay in each line conductor having helices connected respectively to the poles of a centrally-grounded source of current, a selecting and switching device having fixed terminals for each main conductor normally connected by a movable switching-connector with fixed multiple terminals associated with and in the path of the movable switching-connector of the other circuits respectively, a second (universal) fixed terminal for each metallic circuit adapted to be connected with one of the line conductors, and to be switched by the said movable connector to the terminal of any one of the associated circuits, a selecting-electromagnet responsive to the movement of the selecting-relay armature produced by interruptions of the main-line current and controlling the selecting mechanism of said device, and a pawl-retaining electromagnet responsive through the medium of the said line-relays to a sustained main-line current all at the central station; and at each substation, an automatic switch adapted to close the circuit continuously for the establishment of the said sustained current for the operation of the polarized relays, and a selecting-key for grounding one side of the main line and opening the other to produce current interruptions for the operation of said selecting-magnet; as set forth.

6. In an automatic telephone-exchange, the combination of a group of metallic substation-circuits provided with a polarized relay in each line conductor, said relays having their helices connected to the opposite poles of a centrally-grounded battery; a selecting and switching device for each circuit comprising fixed terminals for each main conductor normally connected by a movable switching connector with fixed multiple terminals of said main conductors associated with and in the path of the movable switching-connector of the other circuits respectively, two universal fixed terminals for each metallic circuit adapted to be connected with the line conductors and to be switched by the said movable connector into connection with the terminals of any one of the associated circuits, a selecting-electromagnet responsive to the movement of the selecting-relay armature, produced by interruptions of the main-line current and controlling the selecting mechanism of said device, and a pawl-retaining electromagnet responsive through the medium of the said line-relays to a sustained main-line current to actuate the said polarized relays, all at the central station; and at each substation, an automatic switch adapted to close the circuit continuously for the establishment of the said sustained current for the operation of the polarized relays; and a selecting-key for grounding one side of the main line and opening the other to produce current interruptions for the operation of said selecting-magnet through the medium of said selecting-relay; as set forth.

7. A selecting and switching device, consisting of a base-plate upon which are mounted a selecting-electromagnet and a retaining-electromagnet, standards secured to said plate to which are pivoted the armatures of said magnets which are provided with extensions upon one end thereof, respectively supporting a selecting-pawl and a retaining-pawl, a spindle journaled in said standards having a recovery-spring and supporting on one end insulated switching-springs, and upon the opposite end a ratchet-wheel between said extensions and in proximity to said pawls; with insulated line-conductor terminals supported on a dial formed of one of said standards and in the path of said switching-springs; as set forth.

8. The combination in an automatic telephone-exchange, of a group of metallic substation-circuits, a call-bell and condenser in a bridge and an automatic switch, selecting-key and ringing-key in a parallel branch of said bridge at each substation, the said switch being adapted to close the normally open line-circuit, and each key to open the circuit and ground a line conductor; with selecting and switching apparatus at the central station, consisting of a polarized relay in each line conductor joined to a centrally-grounded battery, a switching device with a pair of switching-springs, in the path of which are concentric pairs of terminals, representing respectively the line conductors of said device and the multipled terminals at all of the switching devices of said group, each of said springs normally resting upon and connecting the terminals of its own line conductors with its own multiple terminals in all said devices, one of the latter or multiple terminals having a branch containing a condenser to one of the line conductors; a selecting-electromagnet to rotate the switching-springs, and a retaining-electromagnet to maintain the springs in position on the terminals; with a pulsatory or intermittent call-current generator in a normally incomplete circuit; the said apparatus adapted to become operative and to cause each line-relay to close independent local circuits and energize the retaining-magnet when the main circuit is closed by its substation-switch, to deënergize the ringing polarized relay, and provide a path for the ringing-current through the call-bell and switching device of a selected substation-circuit in response to the manipulation of said ringing-key; substantially as described.

9. In an automatic telephone-exchange system, the combination with two or more metallic substation-circuits leading to a central station; of selector mechanism at the central station for connecting a calling with a called substation-line, said mechanism comprising terminals representing the substations, and a movable connector adapted to connect terminals of the calling and any called substation-circuit; ringing and selecting relays in the conductors of the calling-circuit respectively; electromagnetic actuating means for advancing the connector; a circuit through said electromagnet closed by the simultaneous energization of the ringing-relay and the deënergization of the selecting-relay; means under control of the calling-substation for simultaneously grounding a circuit by way of one conductor of the calling-substation circuit through the ringing-relay and opening the circuit through the selecting-relay; a ringing-circuit closed by the simultaneous energization of the selecting-relay and deënergization of the ringing-relay, said ringing-circuit extending through the terminals connected by the connector to the called line; and means under control of the calling-substation for simultaneously grounding a circuit by way of one line through the selecting-relay and opening the circuit through the ringing-relay.

10. In an automatic telephone-exchange system, the combination with two or more metallic substation-circuits leading to a central station; of selector mechanism at the central station for connecting a calling with a called substation-line, said mechanism comprising terminals representing the substations, and a movable connector adapted to connect terminals of the calling and any called substation-circuit; ringing and selecting relays in the conductors of the calling-circuit respectively; electromagnetic actuating means for advancing the connector; a circuit through said electromagnet closed by the simultaneous energization of the ringing-relay and the deënergization of the selecting-relay; means under control of the calling-substation for simultaneously grounding a circuit by way of one conductor of the calling-substation circuit through the ringing-relay and opening the circuit through the selecting-relay; a ringing-circuit closed by the simultaneous energization of the selecting-relay and deënergization of the ringing-relay, said ringing-circuit extending through the terminals connected by the connector to the called line; means under control of the calling-substation for simultaneously grounding a circuit by way of one line through the selecting-relay and opening the circuit through the ringing-relay; return motor means in which power is stored up by the advance of the connector; electromagnetic retaining means for holding the connector in its advanced position; and a circuit through the electromagnet of the retaining means closed by the energization of both or either one of the relays to hold the retaining means in operative position, and opened by the simultaneous deënergization of both relays to release the retaining means.

11. In an automatic telephone-exchange system, the combination with two or more substation-circuits leading to a central station; selecting and switching mechanism at the central station, one for each substation-circuit, each of said mechanisms comprising a fixed terminal for each of the two main-line conductors of all of the substation-circuits including its own, each of said terminals being interconnected with its corresponding terminal at the other selecting and switching mechanisms, a movable connector acting in its normal position to engage said terminals of its own substation-circuit conductors and to thereby connect each of its own substation-circuit conductors to its corresponding terminals at their other selecting and switching mechanisms, a second fixed terminal for each main-line conductor of its own substation conductors, and motor mechanism for moving the connector to connect its own substation-circuit conductors with the terminals of the conductors of any other substation-circuit, or with said second terminals of its own substation-circuit when two subscribers both on said circuit wish to communicate with each other.

In testimony whereof I have signed my name to this specification, in the presence of two subscribing witnesses, this 21st day of January, 1904.

ALBERT M. BULLARD.

Witnesses:
HARRY B. THAYER,
ALBERT L. SAER.

In testimony whereof I have signed my name to this specification, in the presence of two subscribing witnesses, this 22d day of January, 1904.

LOUIS A. FALK.

Witnesses:
GEO. WILLIS PIERCE,
JOSEPH A. GATELY.

---

It is hereby certified that in Letters Patent No. 772,024, granted October 11, 1904, upon the application of Albert M. Bullard, of New York, N. Y., and Louis A. Falk, of Boston, Massachusetts, for an improvement in "Automatic Telephone-Exchange System and Apparatus," an error appears in the printed specification requiring correction, as follows: In line 39, page 6, the word "multiplied" should read *multipled;* and that the said Letters Patent should be read with this correction therein that the same may conform to the record of the case in the Patent Office.

Signed and sealed this 1st day of November, A. D., 1904.

[SEAL.]

F. I. ALLEN,
*Commissioner of Patents.* tem, the combination with two or more metallic substation-circuits leading to a central station; of selector mechanism at the central station for connecting a calling with a called substation-line, said mechanism comprising terminals representing the substations, and a movable connector adapted to connect terminals of the calling and any called substation-circuit; ringing and selecting relays in the conductors of the calling-circuit respectively; electromagnetic actuating means for advancing the connector; a circuit through said electromagnet closed by the simultaneous energization of the ringing-relay and the deënergization of the selecting-relay; means under control of the calling-substation for simultaneously grounding a circuit by way of one conductor of the calling-substation circuit through the ringing-relay and opening the circuit through the selecting-relay; a ringing-circuit closed by the simultaneous energization of the selecting-relay and deënergization of the ringing-relay, said ringing-circuit extending through the terminals connected by the connector to the called line; means under control of the calling-substation for simultaneously grounding a circuit by way of one line through the selecting-relay and opening the circuit through the ringing-relay; return motor means in which power is stored up by the advance of the connector; electromagnetic retaining means for holding the connector in its advanced position; and a circuit through the electromagnet of the retaining means closed by the energization of both or either one of the relays to hold the retaining means in operative position, and opened by the simultaneous deënergization of both relays to release the retaining means.

11. In an automatic telephone-exchange system, the combination with two or more substation-circuits leading to a central station; selecting and switching mechanism at the central station, one for each substation-circuit, each of said mechanisms comprising a fixed terminal for each of the two main-line conductors of all of the substation-circuits including its own, each of said terminals being interconnected with its corresponding terminal at the other selecting and switching mechanisms, a movable connector acting in its normal position to engage said terminals of its own substation-circuit conductors and to thereby connect each of its own substation-circuit conductors to its corresponding terminals at their other selecting and switching mechanisms, a second fixed terminal for each main-line conductor of its own substation conductors, and motor mechanism for moving the connector to connect its own substation-circuit conductors with the terminals of the conductors of any other substation-circuit, or with said second terminals of its own substation-circuit when two subscribers both on said circuit wish to communicate with each other.

In testimony whereof I have signed my name to this specification, in the presence of two subscribing witnesses, this 21st day of January, 1904.

ALBERT M. BULLARD.

Witnesses:
HARRY B. THAYER,
ALBERT L. SAER.

In testimony whereof I have signed my name to this specification, in the presence of two subscribing witnesses, this 22d day of January, 1904.

LOUIS A. FALK.

Witnesses:
GEO. WILLIS PIERCE,
JOSEPH A. GATELY.

---

Correction in Letters Patent No. 772,024.

It is hereby certified that in Letters Patent No. 772,024, granted October 11, 1904, upon the application of Albert M. Bullard, of New York, N. Y., and Louis A. Falk, of Boston, Massachusetts, for an improvement in "Automatic Telephone-Exchange System and Apparatus," an error appears in the printed specification requiring correction, as follows: In line 39, page 6, the word "multiplied" should read *multipled;* and that the said Letters Patent should be read with this correction therein that the same may conform to the record of the case in the Patent Office.

Signed and sealed this 1st day of November, A. D., 1904.

[SEAL.]

F. I. ALLEN,
*Commissioner of Patents.*

It is hereby certified that in Letters Patent No. 772,024, granted October 11, 1904, upon the application of Albert M. Bullard, of New York, N. Y., and Louis A. Falk, of Boston, Massachusetts, for an improvement in "Automatic Telephone-Exchange System and Apparatus," an error appears in the printed specification requiring correction, as follows: In line 39, page 6, the word "multiplied" should read *multipled;* and that the said Letters Patent should be read with this correction therein that the same may conform to the record of the case in the Patent Office.

Signed and sealed this 1st day of November, A. D., 1904.

[SEAL.]

F. I. ALLEN,
*Commissioner of Patents.*